(12) United States Patent
Cornell et al.

(10) Patent No.: US 7,234,282 B2
(45) Date of Patent: Jun. 26, 2007

(54) MODULAR TOWER

(75) Inventors: Walter Cornell, Rockledge, FL (US); Roger Toupin, Windham, NH (US)

(73) Assignee: Process Marketing, Inc., New Haven, CT (US)

( * ) Notice: Subject to any disclaimer, the term of this patent is extended or adjusted under 35 U.S.C. 154(b) by 13 days.

(21) Appl. No.: 10/717,001

(22) Filed: Nov. 19, 2003

(65) Prior Publication Data

US 2004/0098941 A1 May 27, 2004

Related U.S. Application Data

(62) Division of application No. 10/010,242, filed on Dec. 7, 2001, now Pat. No. 6,679,025.

(60) Provisional application No. 60/254,273, filed on Dec. 8, 2000.

(51) Int. Cl.
*E04H 12/00* (2006.01)

(52) U.S. Cl. .................. 52/651.01; 52/118; 52/745.02; 52/125.1

(58) Field of Classification Search ............. 52/651.01, 52/118, 119, 123.1, 745.02, 745.03, 125.1, 52/125.2, 126.5; 212/270, 271; 414/10, 414/11, 12
See application file for complete search history.

(56) References Cited

U.S. PATENT DOCUMENTS

| | | | | |
|---|---|---|---|---|
| 1,167,871 A | * | 1/1916 | Adams | 52/3 |
| 1,299,261 A | * | 4/1919 | Taylor | 52/745.18 |
| 1,362,069 A | * | 12/1920 | Witzel | 52/745.03 |
| 1,426,276 A | * | 8/1922 | Christie | 52/28 |
| 2,222,037 A | | 11/1940 | Lafferty | |
| 2,923,381 A | * | 2/1960 | Wilkinson et al. | 52/115 |
| 2,965,408 A | * | 12/1960 | Edwards | 294/81.5 |
| 2,974,760 A | * | 3/1961 | Woolslayer et al. | 52/637 |
| 3,752,262 A | | 8/1973 | Helms | |
| 3,768,016 A | | 10/1973 | Townsend et al. | |
| 3,807,120 A | | 4/1974 | Viandon | |
| 3,817,347 A | * | 6/1974 | Spencer | 182/115 |
| 3,974,618 A | * | 8/1976 | Cortina | 52/745.14 |
| 3,980,418 A | | 9/1976 | Schott, Jr. | |
| 4,243,363 A | | 1/1981 | Mulchy | |

(Continued)

*Primary Examiner*—Carl D. Friedman
*Assistant Examiner*—Basil Katcheves
(74) *Attorney, Agent, or Firm*—Brian S. Steinberger; Law Offices of Brian S. Steinberger, P.A.

(57) ABSTRACT

A modular tower assembly for use with blown film extrusion processes, where modular tower sections each having identical columns/foot prints can be stacked on top of one another. Each module can have rectangular type platforms with walk decks about a central rectangular void middle. Staircases can be built into the side of all decks modules up to the top deck. Each of the four vertical legs of the deck modules has flat plate bottoms to stack on the deck surface of the module beneath, and side cross bracing. Side extension platform deck wings with legs can be used when the central rectangular void is enlarged. The modules can be pre-formed and brought onsite to be erected in a rapid assembly manner by fasteners such as bolts, and be removable as compared to permanent type welded towers. The modular towers can include adjustable bracing components for further stiffening the modular towers to have reduced swaying, twisting and vibrations over time.

8 Claims, 13 Drawing Sheets

U.S. PATENT DOCUMENTS

| | | | |
|---|---|---|---|
| 4,276,956 A * | 7/1981 | Mamula et al. ............. 182/128 |
| 4,355,966 A | 10/1982 | Sweeney et al. |
| 4,402,656 A | 9/1983 | Schott, Jr. |
| 4,533,309 A | 8/1985 | Planeta |
| 4,650,406 A | 3/1987 | Peters |
| 4,867,274 A | 9/1989 | Langer |
| 5,012,627 A * | 5/1991 | Lundmark ............... 52/745.04 |
| 5,135,077 A | 8/1992 | Shalders |
| 5,371,993 A * | 12/1994 | Saito ......................... 52/745.1 |
| 5,441,395 A | 8/1995 | Planeta |
| 5,450,695 A * | 9/1995 | Desai ........................ 52/118 |
| 5,912,021 A | 6/1999 | Planeta |
| 6,059,554 A | 5/2000 | Krycki |
| 6,183,165 B1 * | 2/2001 | Heinrichs et al. ........ 405/195.1 |
| 6,405,831 B1 | 6/2002 | Daniel, III |
| 6,679,025 B1 * | 1/2004 | Cornell et al. ........... 52/745.02 |

\* cited by examiner

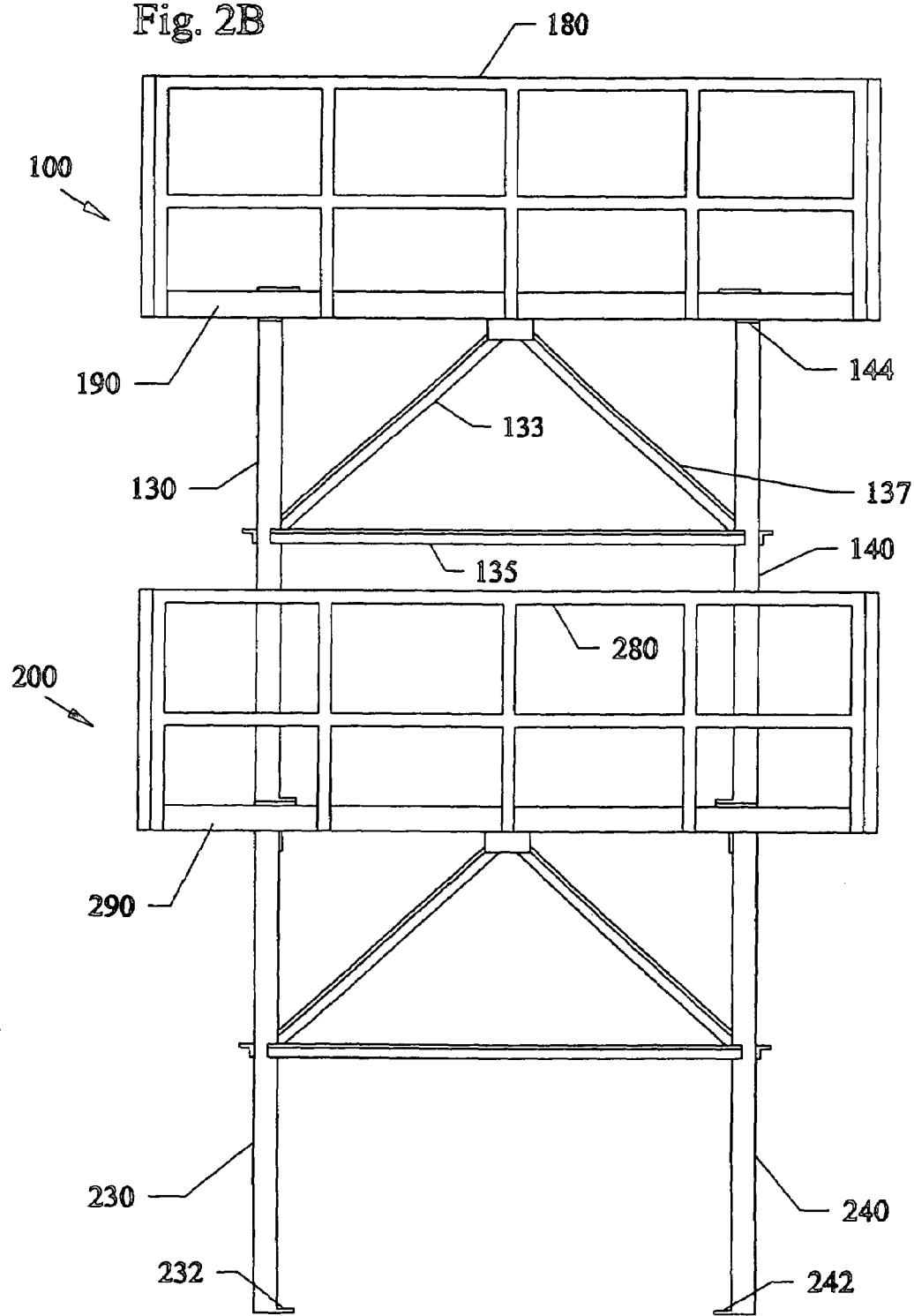

MODULAR TOWER

This application is a divisional application of U.S. patent application Ser. No. 10/010,242 filled on Dec. 7, 2001, now U.S. Pat. No. 6,679,025 issued on Jan. 20, 2004, which claims the benefit of U.S. Provisional application 60/254,273 filed Dec. 8, 2000.

FIELD OF THE INVENTION

This invention relates to towers, and in particular to a modular tower and a method of assembling the modular tower useful for different processes such as blown film processes having modular tower sections, each section having the same columns/foot prints for facilitating pre-wiring and pre-piping that can be stacked on top of one another, along with novel bracing.

BACKGROUND AND PRIOR ART

The blown film extrusion process is a vertically oriented extrusion process that requires a structure, commonly called a "blown film tower" to host equipment at different elevations and provide physical space to enhance film cooling. The blown film process is a well known type of thermoplastic extrusion process where raw materials such as pellets of solid polyethylene are placed into and gravity fed through a hopper. A feed screw and electric type heater component inside a barrel beneath the hopper further mushes and melts the pellets. A resulting uniform homogenous melted material (having the consistency of a jello type material) is then fed through a coloring dye into the bottom of a blown film tower, where a compressed air supply injects air into a holder forming a film bubble. The resulting bubble rises upward through the middle of the tower to a shaping device such as a hollow funnel adjacent to the top of the tower having a narrow upper opening where a conventional nip and roll assembly on top of the tower allows for resulting film to be pulled out.

Conventional blown film towers are usually custom made for each worksite to specific heights and dimensions. These towers include many raw steel type materials and extensive labor installation time for assembly. Generally, the components of these conventional towers are permanently welded in place. Installing these towers can take up to 45 days or more to assemble and cost up to and over some $400,000 to complete. U.S. Pat. No. 3,980,418 to Schott, Jr.; U.S. Pat. No. 4,243,363 to Mulcahy; U.S. Pat. No. 4,355,966 to Sweeney et al. and U.S. Pat. No. 4,402,656 to Schott, Jr., each show blown film processing systems that use conventional type towers having the types of problems previously described.

Other Patents exist on scaffolding type systems and stair case units that also fail to overcome problems described above. These patents include U.S. Pat. No. 3,752,262 to Helms; U.S. Pat. No. 3,768,016 to Townsend et al.; U.S. Pat. No. 3,807,120 to Viandon; U.S. Pat. No. 3,817,347 to Spencer; U.S. Pat. No. 4,867,274 to Langer; U.S. Pat. No. 5,135,077 to Shalders and U.S. Pat. No. 5,491,939 to Wang.

SUMMARY OF THE INVENTION

The primary objective of this invention is to provide a modular blown film tower that is customizable for different features. Auxiliary components such as cooling coils, blenders, and the like can be added onto the tower. Floor elevation, stair placement can be adjusted, and additional mezzanine extensions and deck areas can also be expanded or contracted.

The second objective of this invention is to provide a modular blow film tower that is easily changeable. The tower can be reconfigured for a different setup and/or dismantled and moved for relocation purposes.

The third objective of this invention is to provide a modular blow film tower that is quick and simple to install. The novel tower can arrive onsite in a prefabricated kit form that can be fastened together with bolts, and the like, in approximately one to five days (usually encompassing no more than approximately 8 to approximately 30 hours). The bolt type fastened construction minimizes disruptions to existing facilities, and can be planned for installation on the user's desired schedule.

The fourth objective of this invention is to provide a modular blow film tower that made for the selected worksite. The modular tower would be adaptable and is not isolated from other different existing towers that can exist onsite, since the modular tower allows for width, depth, and elevation adaptability to almost all types of plants. Using two modular towers allows for common servicing for each film line in a plant.

The fifth objective of this invention is to provide a modular blow film tower that allows the ability of the blown film processing user to be able to refit their lines in place. This ability allows the user to easily expand a line widths and/or elevations as their few process opportunities demand changes.

The sixth objective of this invention is to provide a modular tower for processes such as blown film processes that allows the user to use identical column footprints for different levels.

The seventh objective of this invention is to provide a modular tower having adjustable braces such as cross-braces, for stiffening the tower and for reducing swaying and twisting of the tower along with reduced vibrations, when plural platforms are stacked on top of one another.

The eighth objective of this invention is to provide a modular tower having adjustable braces such as cross-braces, for stiffening the tower and for reducing swaying and twisting of the tower along with reduced vibrations, when heavy equipment is placed on the tower.

The ninth objective of this invention is to provide a modular tower having adjustable braces such as cross-braces, for stiffening the tower and for reducing swaying and twisting of the tower along with reduced vibrations, when equipment such as machinery is running on the tower.

The tenth objective of this invention is to provide a modular tower that can use the same backfill (support member) for different sized nip components (i.e. different widths, lengths, etc.), without having to customize a separate backfill and/or separate tower structure for each different sized nip component.

The preferred embodiment of the invention includes a modular multi-level blown film tower that can be fastened together by bolts. The modular tower allows for concurrent erection of the elevated equipment necessary for blown film processing along with the tower itself. This method vastly reduces time and cost of blown film equipment installation. The novel fixed position of the tower columns and known platform area simplifies and eases the electrical wiring and water and air piping of the equipment routed through the tower again reducing time and costs. The modular components for the tower can include core platform segments, handrails, columns, stairs and backfill. Various extensions can be utilized for expanding the platform area for accommodating nip assembly and additional equipment width variability. Easy expansion or contraction optimizes platform areas for tower mounted equipment. Each additional extension level can also consist of platform segments, handrails, columns, stairs and backfill. The stackable assembly method allows for concurrent equipment and platform lifting. This is done by attaching the film equipment to its respective platform at floor level then raising both the platform and the equipment together adding subsequent levels of combinations of equipment and platforms. The stackable assembly method eliminates having to open up a roof of a building in order to place equipment on a previously established tower.

Columns supporting each of the platform levels above the floor are dimensionally fixed despite the width of the nip roll and collapsing assembly. When nip assembly widths encroach on the outer limits of the structure thus eliminating operator access in the cross direction, extensions can be added. Conversely, narrow nip assemblies can be hosted by backfilling the opening with a separate metal (such as steel) insert on the available inside area. The pre-positioned fixed columns and platform dimensions allow for pre-calculated paths for servicing the tower hosted equipment with required wires, air and water pipes/ducts. This advance planning capability is key to reducing equipment installation time and cost. Since buildings using blown film processing varies as to size and dimensions, the modular tower invention allows for variable height levels as needed in order to conform to the available installation space and/or to match the size and dimensions of existing structures.

Adjustable bracing such as cross-bracing having threaded bars, and the like, can be attached to tower legs and to cross members to aid in stiffening the tower when heavy equipment is positioned on the tower, machinery is running on the tower and/or when plural platforms are stacked on top of one another. The adjustable bracing can square off, center, and align the tower. Furthermore, the towers can have reduced swaying, twisting and vibrations over time.

Further objects and advantages of this invention will be apparent from the following detailed description of a presently preferred embodiment which is illustrated schematically in the accompanying drawings.

BRIEF DESCRIPTION OF THE FIGURES

FIG. 2B is a side view of the FIG. 2A along arrow A without stairs.

DESCRIPTION OF THE PREFERRED EMBODIMENT

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

First Embodiment

Figure 1:
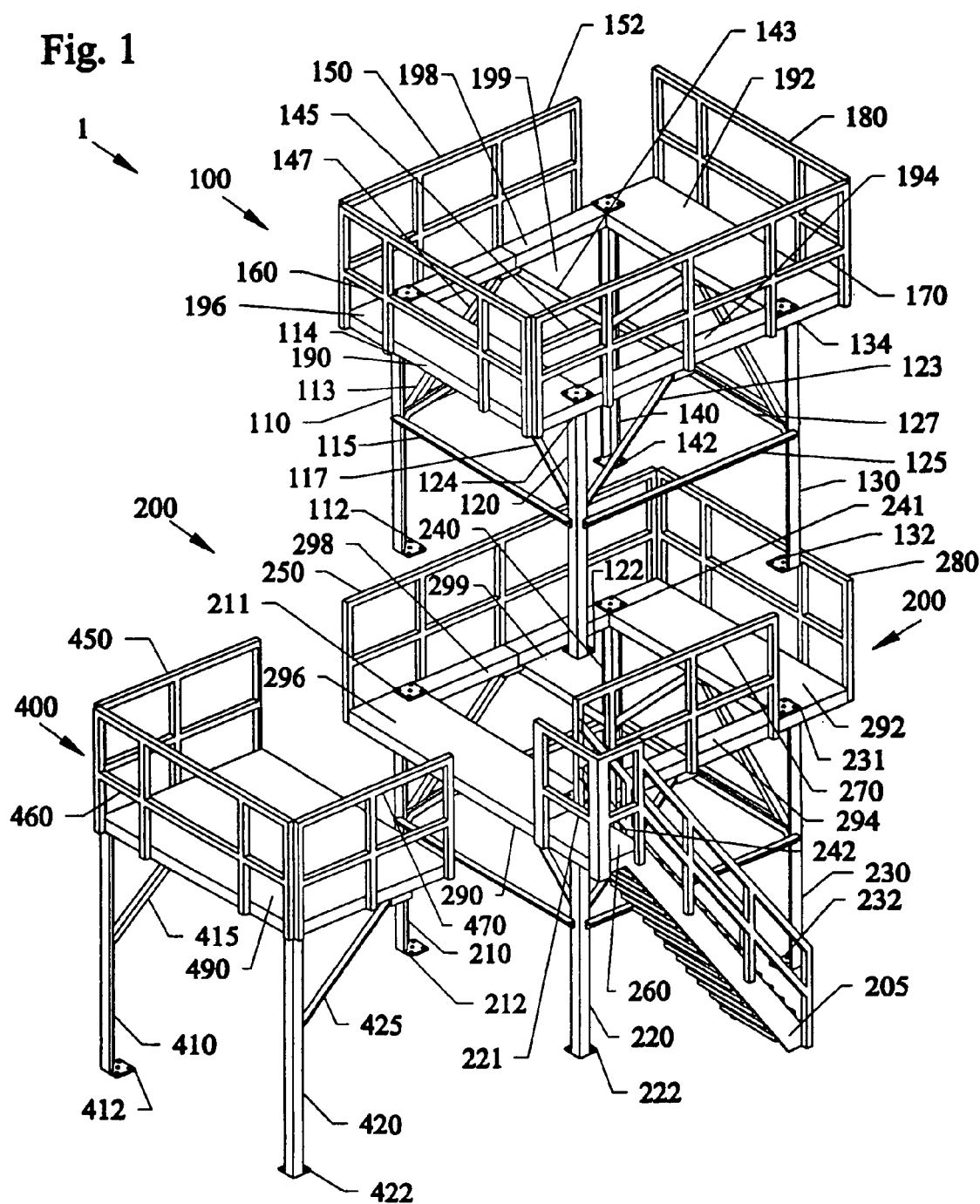
FIG. 1 is an exploded perspective view of a first preferred embodiment of the modular tower assembly.
Figure 2A:
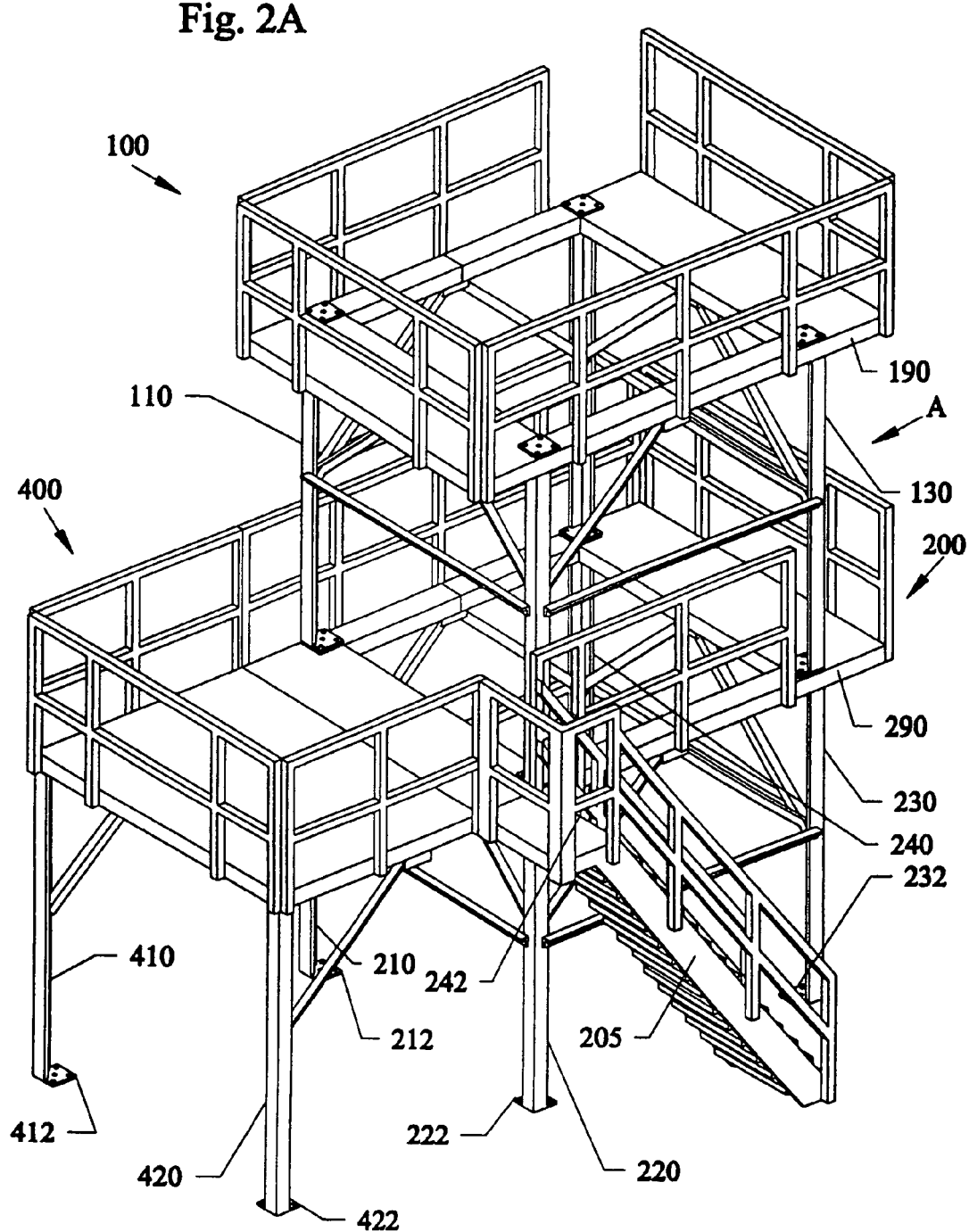
FIG. 2A is a perspective view of FIG. 1 with the modular tower assembly attached together.

FIG. 1 is an exploded perspective view of a first preferred embodiment 1 of the modular tower assembly. FIG. 2A is a perspective view of FIG. 1 with the modular tower assembly attached together. FIG. 2B is a side view of the FIG. 2A along arrow A without stairs.

Referring to FIGS. 1, 2A and 2B tower assembly 1 includes a top platform 100 having four column legs 110, 120, 130, 140 having upper ends 114, 124, 134, 144 attached to an underside portion of the frame 190 of the platform 100, and lower flat feet portions 112, 122, 132, 142. Cross-bracing members 113, 115, 117, 123, 125, 127, 133, 135, 137, 143, 145, 147 form triangular structures attached between columns 110-140 and deck frame 190. About the deck frame 190 can be four hand rail sections 150, 160, 170 and 180 that can also be similarly fastened thereto as the column legs 110-140. A shortened handrail section 152 has an opening for allowing a stairway (not shown here) to be accessed. The decking platform 190 has walkway portions 192, 194, 196, 198 for allowing workers to move about and access the nip assembly (shown and described later in reference to FIGS. 3–6). A void 199 in deck 190 is used as the bubble void area previously described in the background section of the application.

A lower platform 200 has similar components to the upper platform 100. Lower platform 200 can include column legs 210, 220, 230, 240 each with flat feet ends 212, 222, 232, 242, respectively, and cross-bracing members forming triangular portions between the columns. On the top of deck 290 are upper column ends 211, 221, 232, 241 which have the same locations as feet portions 112, 122, 132, 142, respectively, so that the columns can be attached to one another in the same locations. Side handrails 250, 280, 270 surround the perimeter of decking platform 290. Here, a corner handrail 260 can stick from the deck platform 290 for allowing a stairway 205 to be attached thereto. Walkway portions 292, 294, 296, 298 are similar to those described in reference to upper platform 100.

An optional side platform extension 400 can be attached to side of the deck platform 290. Side platform can have a solid deck platform 490 with two column legs 410, 420 each with respective lower flat feet portions 412, 422 that allow the platform to be supported at ground level or on top of another side platform if an additional platform level is below platform 200. Cross braces 415, 425 support the column legs 410, 420 and side handrails 450, 460, 470 similarly to those described for platforms 100, 200 can also be used. Side or rear platforms 400 can be used for supporting more equipment thereon, and or workers, and the like. The side/rear extension platforms can also be used for the upper platforms 100 when larger equipment (such as but not limited to large nip assembly components (shown and described in reference to FIGS. 3–5) are used. The side/rear extensions 400 optimize the platform areas and walkway areas for tower mounted equipment. Each side/rear extension can also include separate stairways as needed.

The platforms 100, 200, 400 can be made from metal such as but not limited to steel, and the like, where substantially all of the components can be fastened together by bolts, and the like. A working version of the two level embodiment 1 can have a general load bearing of approximately 75 pounds per square foot, with point loading (at center of tower) able to support approximately 1000 pounds. The lower second level 200 can be approximately 8 to approximately 12 feet high from ground level, with the top first level 100 approximately 10 feet higher than the lower level 200. The overall height of the two level tower top deck 190 can between approximately 18 and approximately 22 feet above ground level.

Figure 3:
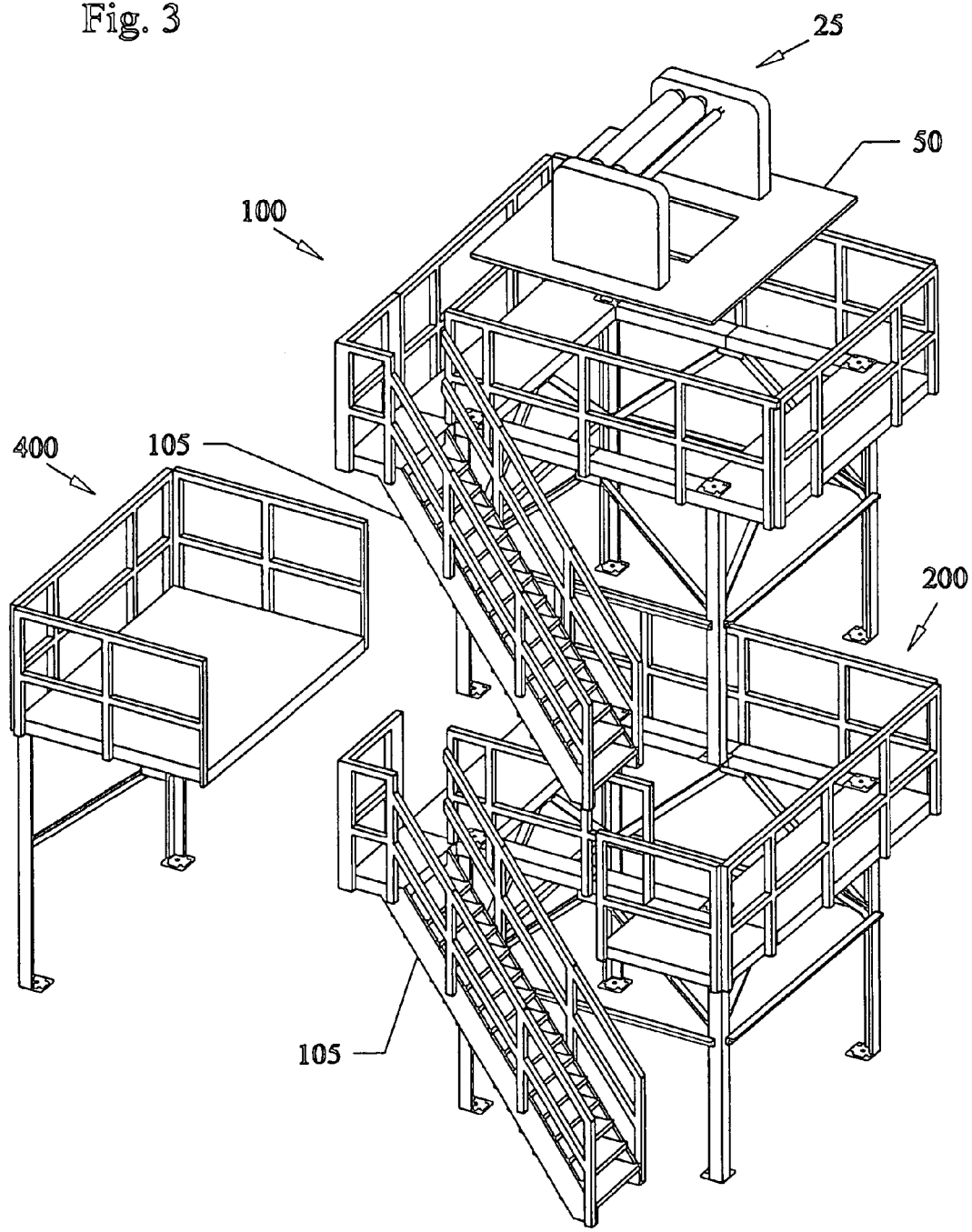
FIG. 3 is an exploded perspective view of FIG. 1 with a Nip component and backfill support.

FIG. 3 is an exploded perspective view of FIG. 1 with a Nip component assembly 25 supported thereon by a backfill support member 50, such as a steel plate, and the like. The novel stackable nature of the invention allows for concurrent equipment and platform lifting. The novel modular towers can be constructed in pre-existing buildings 10 without having to remove the entire or substantial portions of the roof 12. In this example, a small opening 15 can be used in the roof 12 large enough to allow a line 77 from an exterior located crane 80 to be inserted therethrough. The line can be connected to a crane type hook 75 which can be attached to cradle type lines 70 which can be attached to the backfill support member 50 which supports the nip assemblies 25 used in blown film processing applications such as those previously described in the background section of the invention.

Figure 4:
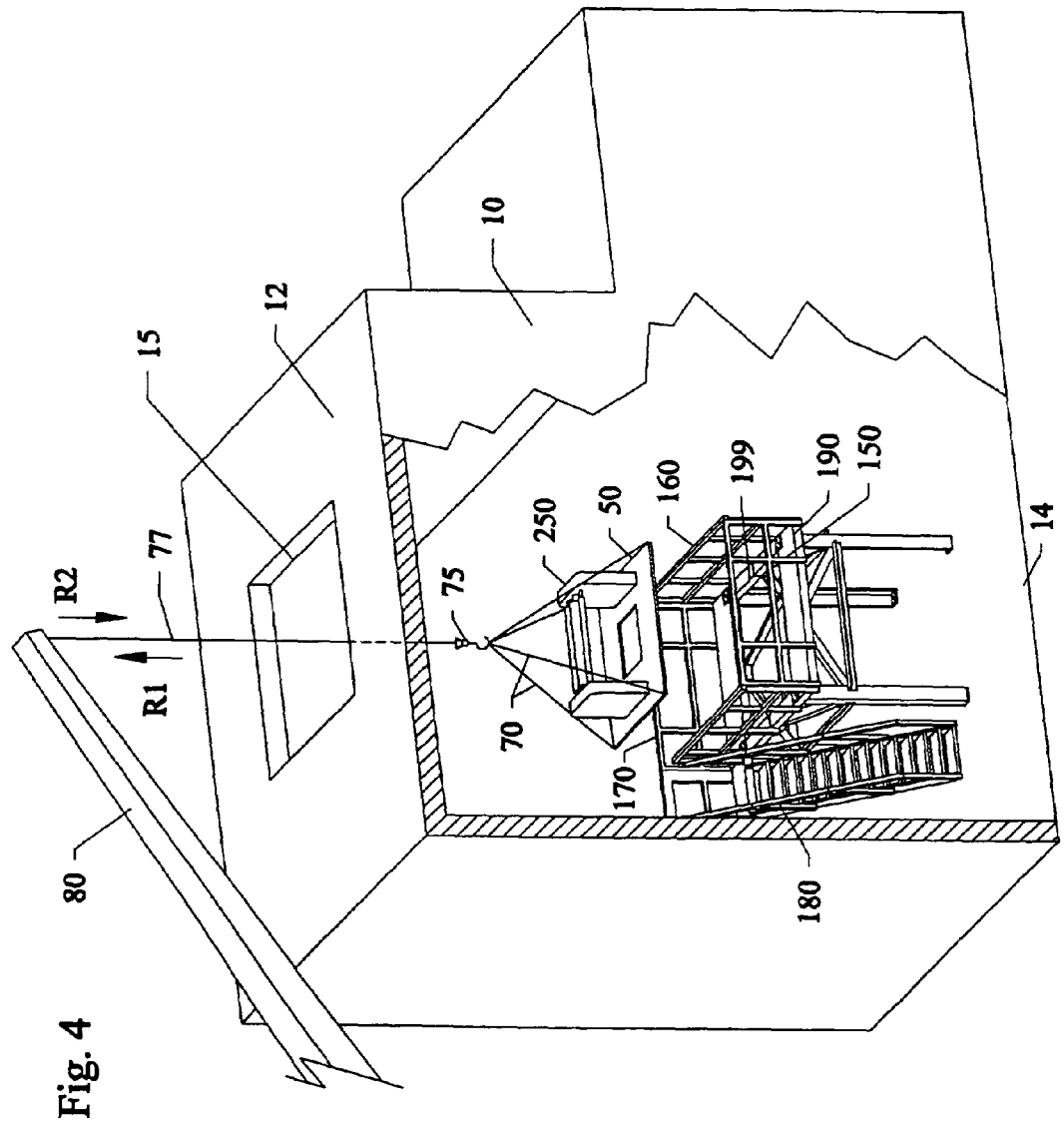
FIG. 4 is a view of the nip component and backfill support being raised inside of a building.

FIG. 4 is a view of the nip component 25 and backfill support 50 being raised inside of a building 10, from floor level 14 in the direction of arrow R1. As the backfill and nip components 25 are in a raised position, the top platform deck 190 with handrails 150, 160, 170, 180 can be assembled on the floor level 14. Thus, the space below the raised backfill 50 and nip components 25 can become a staging center for the platforms. After platform 190 with handrails 150–180 is assembled, the backfill support 50 with nip component 25 can be lowered down in the direction of arrow R2 onto the platform 190 and attached thereto as needed. Next the cradle type lines 70 can be reattached to the platform 190. Alternatively, while the backfill support 50 and nip component 25 are in a raised position of R1, the upper platform 190 and it's associated components such as handrails 150–180 along with columns 110–140 can be erected on floor level 14.

Figure 5:
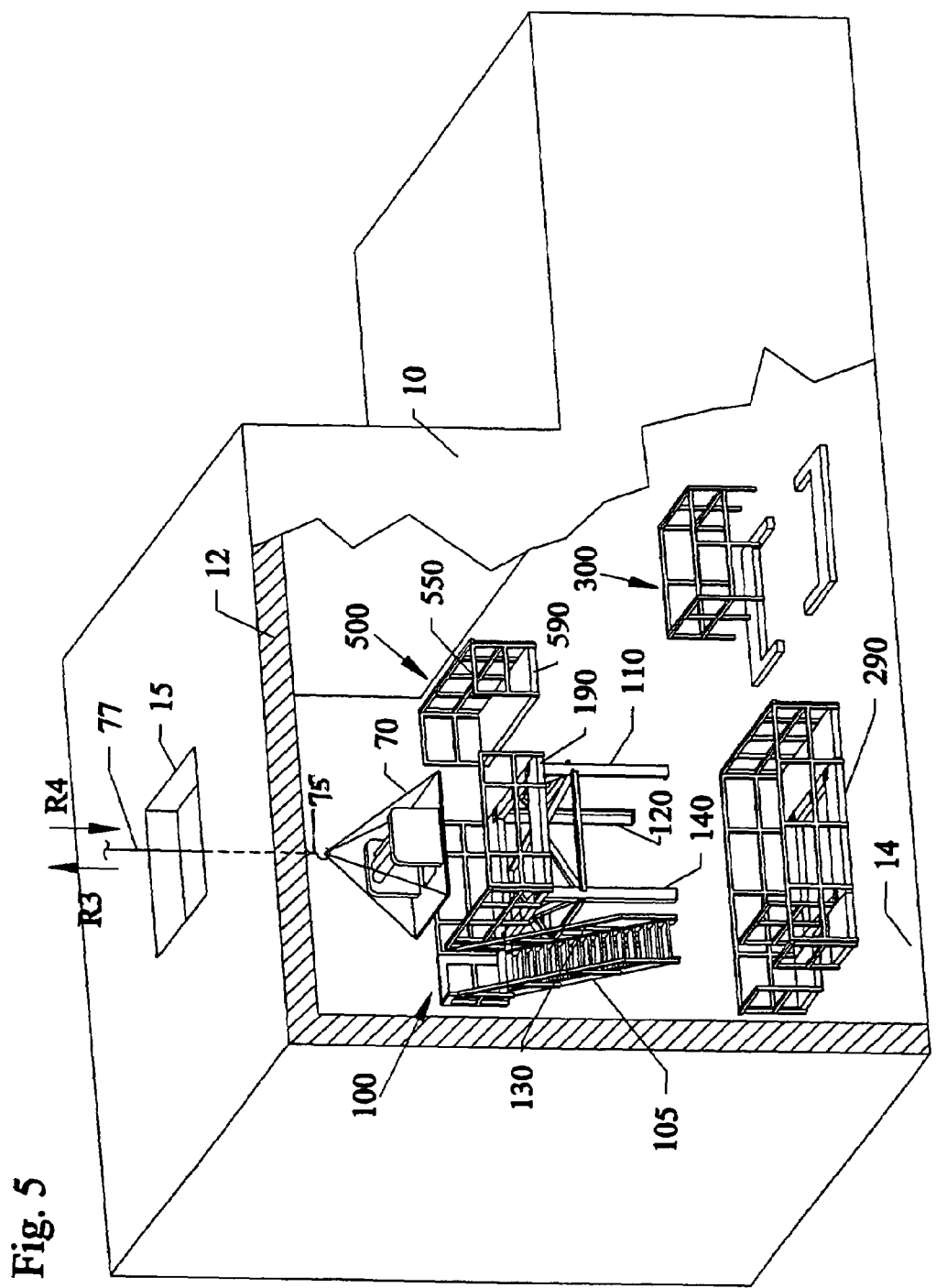
FIG. 5 is a view of the nip component, backfill support, and first platform being raised above a second platform being readied.
Figure 6:
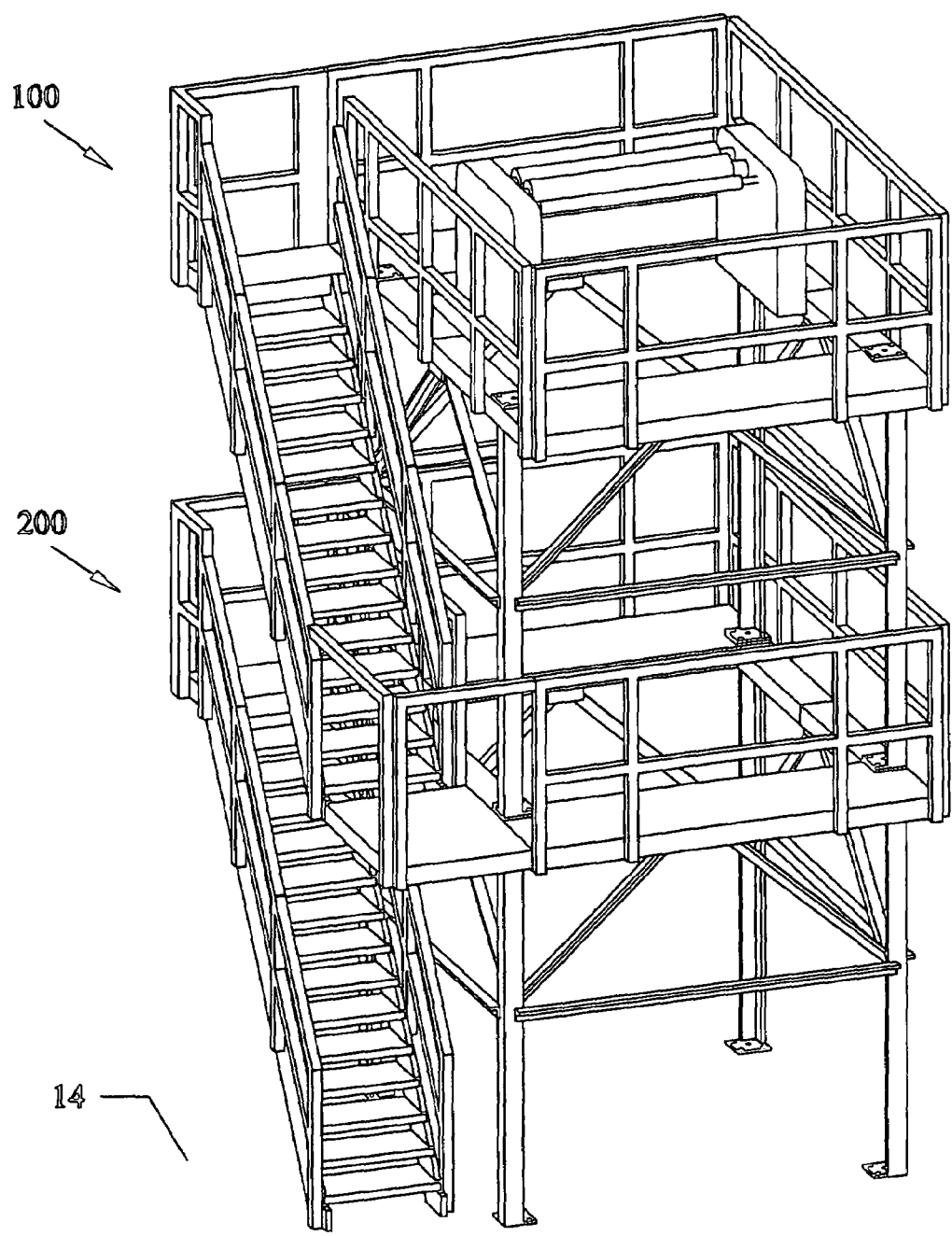
FIG. 6 is an assembled view of FIGS. 4 and 5 with two platforms.

FIG. 5 is a view of the nip component 25, backfill support 50, and first platform 100 being raised above while a second platform components 290, and associated handrails are being readied. In FIG. 5, the cradle lines 70 are attached to upper platform 100 which already has handrails, stairway 105 and vertical column legs 110–140 attached thereto, and are raised above floor level 14 in the direction of arrow R3. When either deck platform 290 and associated handrails or deck platform 290 and associated handrails and its' respective column legs 210–240 are attached, the upper deck 100 is lowered in the direction of arrow R4, with the respective lower flat feet ends 112, 122, 132, 142 (shown more clearly in FIGS. 1–2) are positioned in the identical column foot prints 211, 221, 231, 241 of lower platform 200. Referring to FIG. 5 additional modular extension 500 having a deck platform portion 590 and side handrails 550 with or without column legs, can be attached to the side of upper platform 100 as needed. When either modular extension 500 or side/rear extension platforms 400 (previously shown and described) are used, adjacent handrails on the platform 100 can be removed when needed. Auxiliary components (not shown) used in blown film processing techniques such as but not limited to cooling coils, blenders, and the like can be added onto the tower. FIG. 6 is an assembled view of FIGS. 4 and 5 with two platforms 100 and 200 in place.

Second Embodiment

Figure 7A:
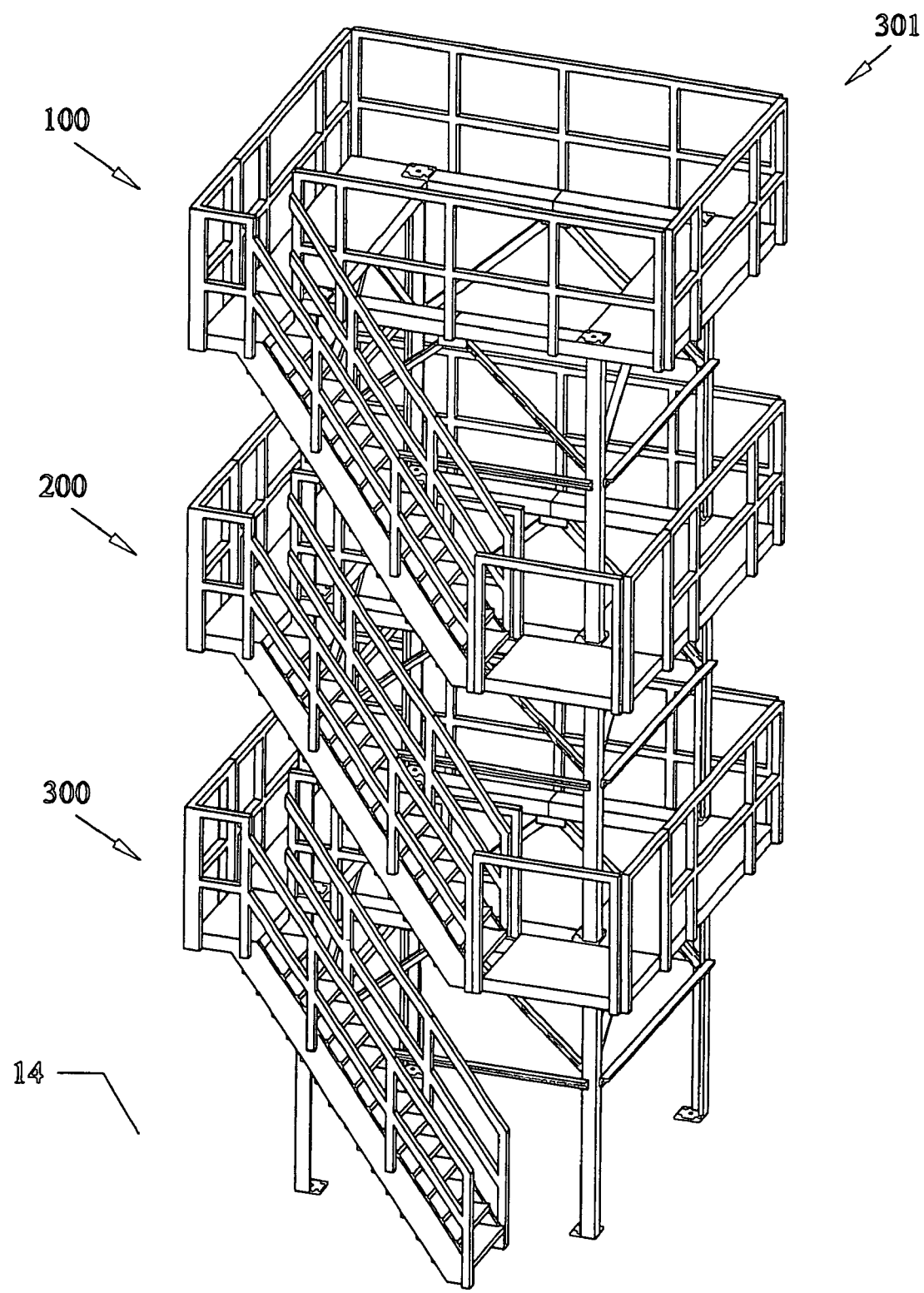
FIG. 7A is a perspective view of a second embodiment of a three platform modular tower.
Figure 7B:
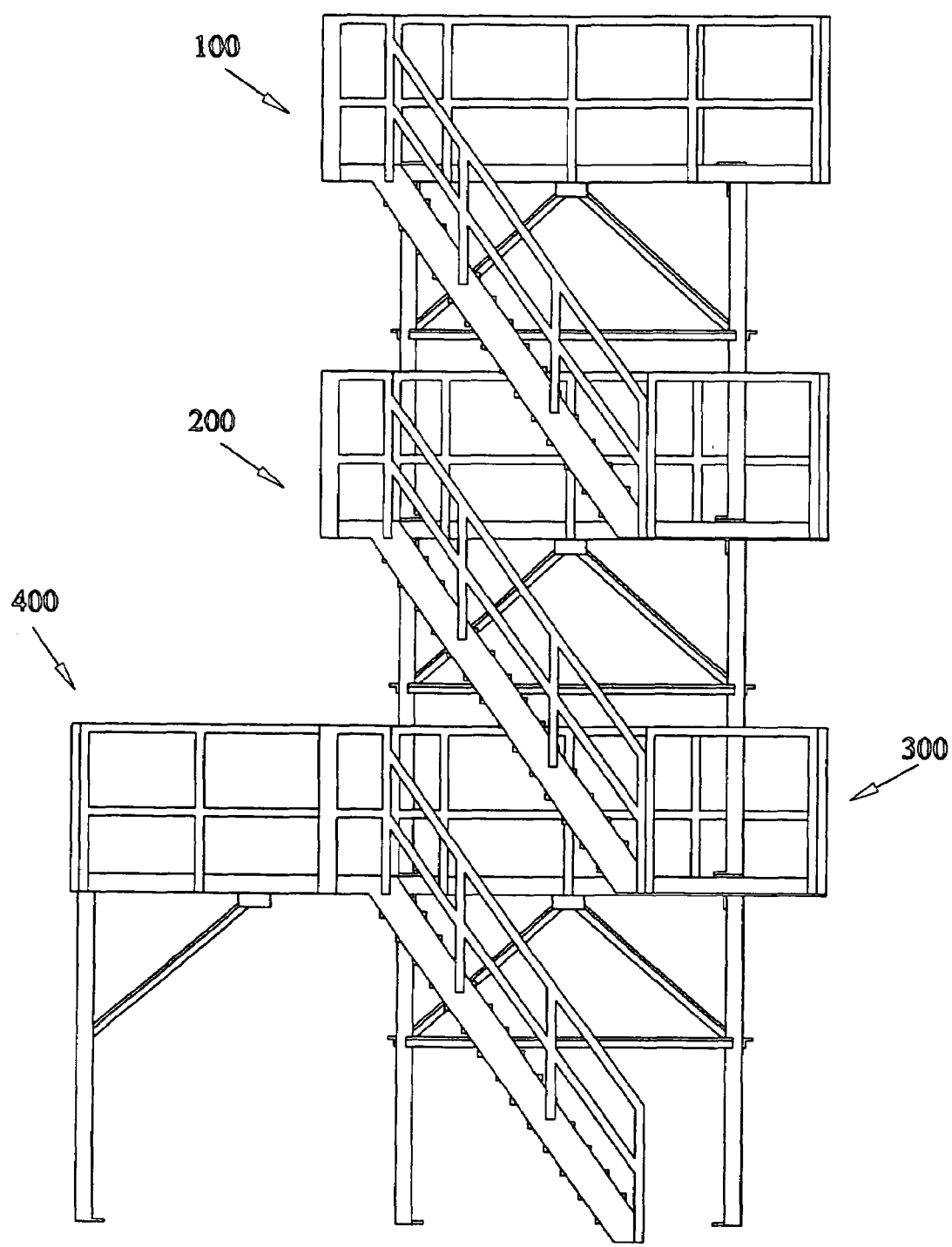
FIG. 7B is a side view of the second embodiment of FIG. 7A along arrow B.

FIG. 7A is a perspective view of a second embodiment 301 of a three platform modular tower with three platforms 100, 200, 300. FIG. 7B is a side view of the second embodiment of FIG. 7A along arrow B. Referring to FIGS. 6, 7A, and 7B, a third platform 300 with or without column legs can be readied while the platforms 100 and 200 are being in a raised position similar to when platforms 100 and 200 were being erected. Similar to the first embodiment, three and more platforms can be assembled with this invention all having fixed columns and feet ends. The three level embodiment of FIGS. 7A–7B can have the upper top deck 100 approximately 28 to approximately 32 feet above ground level.

Third Embodiment

Figure 8:
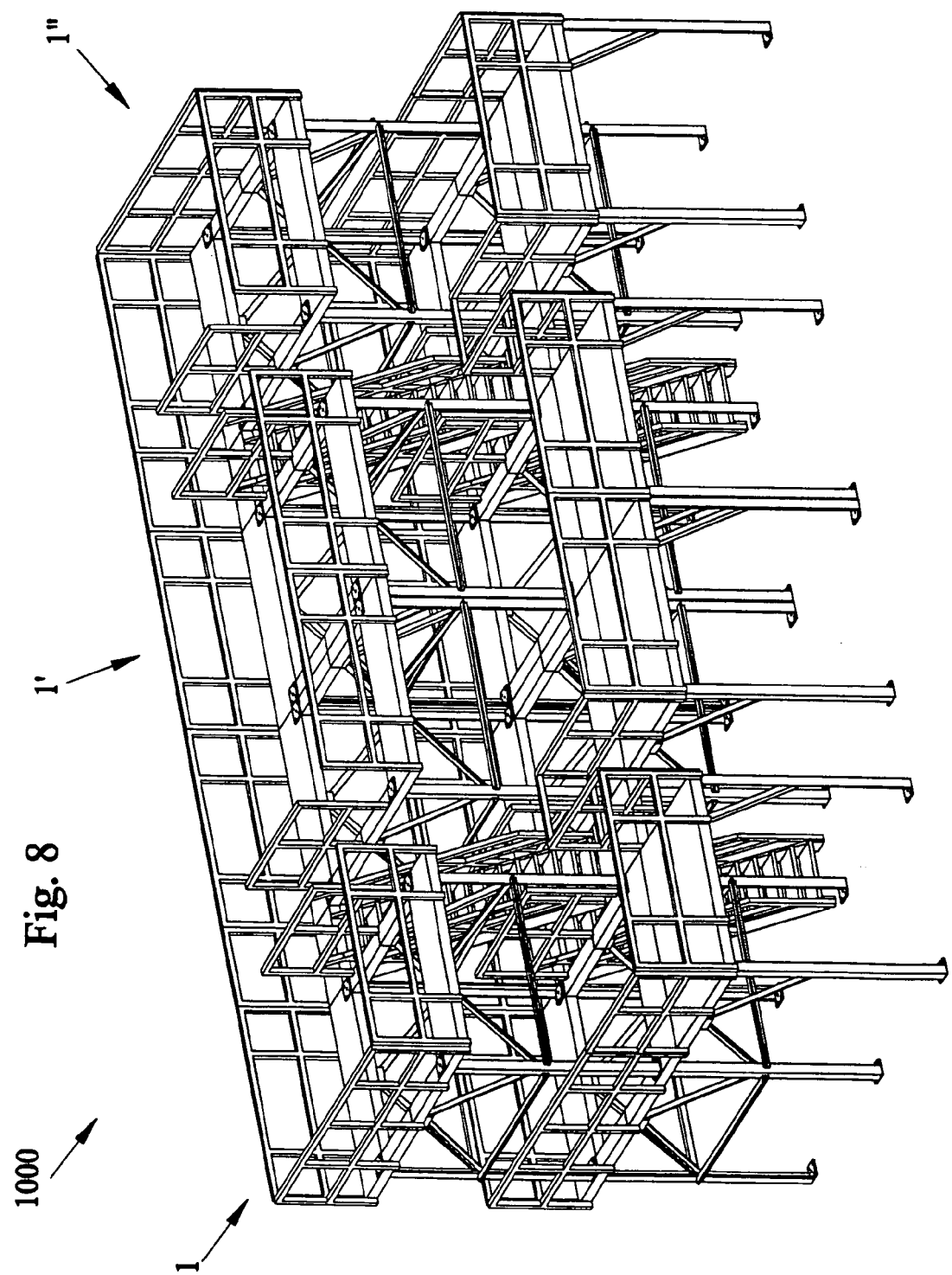
FIG. 8 is a perspective view of a third embodiment of plural modular towers of the first embodiment attached side-by-side to one another.

FIG. 8 is a perspective view of a third embodiment 1000 of plural modular towers 1, 1', and 1" of the first embodiment 1 attached side-by-side to one another. Additional towers can be attached side by side to form four or more towers in a row. Additionally, the novel towers can be placed in together in different formations to form different layout orientation configurations, such as an L-shape, a T-shape an X shape configuration, rectangular configuration, and the like. Additionally, a ground level platform can be larger than the upper stacked platforms so that matched footprints are one the upper platforms only. Thus, a lower platform can have greater expanded spread apart foot prints for their vertical columns (legs) than the footprints of the columns on the upper stacked platforms. Furthermore, various combinations of different spaced apart footprints for different platforms can be used together in different combinations.

Fourth Embodiment

Figure 9:
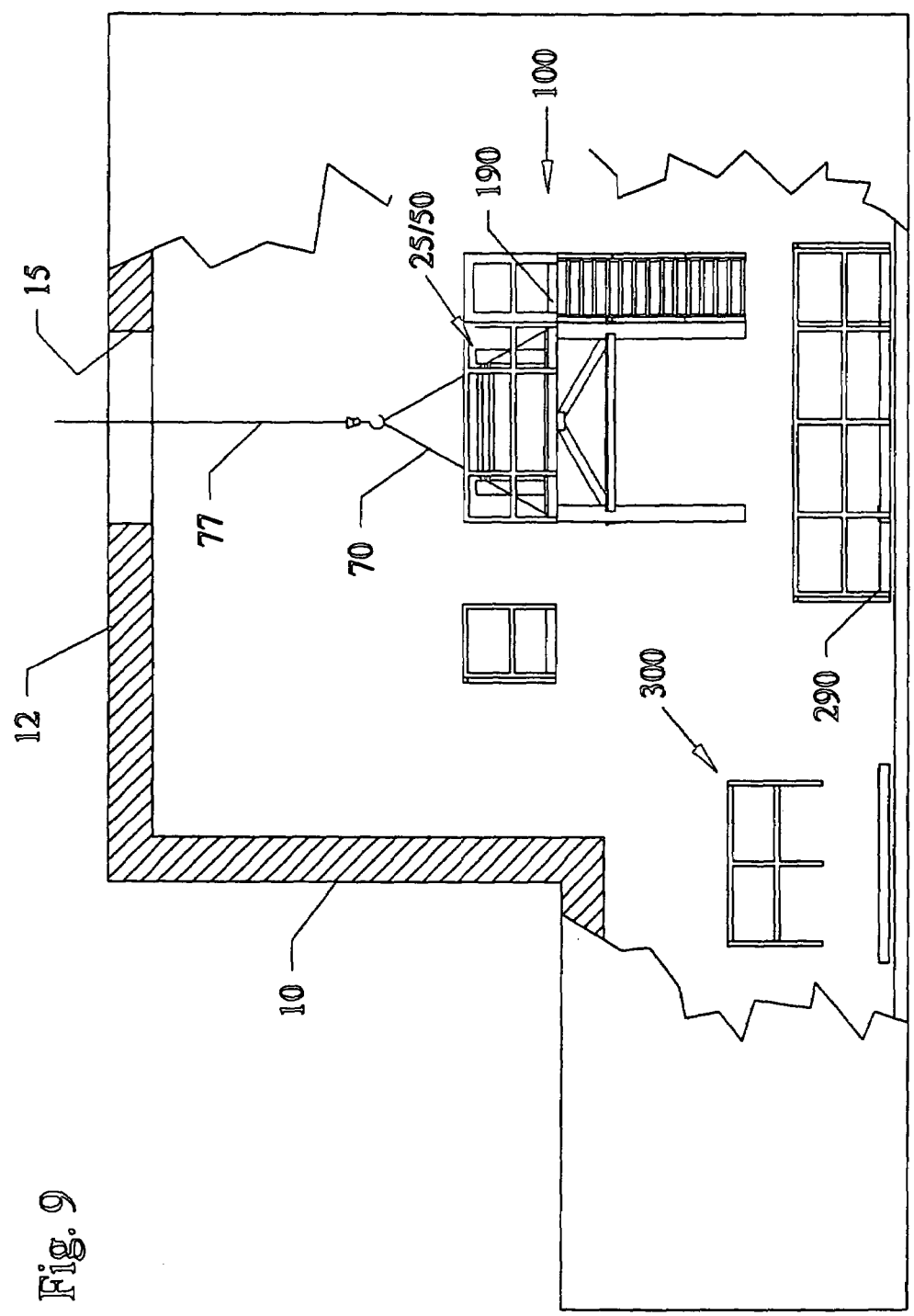
FIG. 9 is a side view of a fourth embodiment lifting both a nip assembly and a platform assembly concurrently.

FIG. 9 is a side view of a fourth embodiment of lifting components concurrently to build the modular tower such as lifting both a nip assembly 25/50 and a platform assembly 100 concurrently. The concurrent lifting can allow both a backfill 50 and nip components 25 to be pre-placed on a platform deck 190 with or without the vertical legs beneath the platform deck, and lifted by lines 70 connected to hook 75 which is attached to line 77 which passes through an opening 15 in the roof 12 of a building 10. Likewise, other concurrent lifting can allow both nip assembly 25/50 with an entire platform assembly 100 to be lifted concurrently. This concurrent lifting capability can be used with any of the proceeding embodiments disclosed.

In some old techniques, it was possible to directly attach a nip component to a platform deck without using a separate and isolated backfill (support member), and then lift the deck and nip component upward. However, this old technique had problems of requiring a nip component to be permanently attached to the deck, which has required some customization and additional cost and expense.

With the subject invention, a concurrent lift can be accomplished. Here, a nip component with backfill can be placed on a deck and then lifted upward. The backfill can remain separate and isolated from the deck, and the nip does not have to be permanently mounted to the deck itself. Thus, no permanent attachment is necessary and no customization would be required, and reduced costs and expenses will result during the construction of the towers.

In conventional center rig type techniques, a nip component has been known to be able to be lifted upward through a center opening of a tower by center type rigging. After the nip assembly is lifted up, an artificial backfill must be separately created and formed on top of the platform after the nip component has been raised, which often results in customizing backfills (support members) every time a tower is constructed. Additionally, it should be noted that these artificially created backfills have to be created on top of large height towers which is an additional problem as to cost and expense.

In the subject invention, a backfill (support member) is not created on top of the tower. Here, a nip component is set onto a pre-created backfill (support member) on ground level. Then both the nip component and the backfill can be raised up through the middle opening in the tower by using a center rigging on top of the tower, and then positioned on the top deck of the tower using methods previously described above. Thus, workers do not have the extra time and expense of creating a customized backfill on top of the tower.

The subject invention allows for different sized nip components (i.e. larger, smaller, wider, narrower, etc.) to be placed on the tower without having to customize a separate backfill (support member) and/or customize a separate tower structure every time a different sized nip component is being used. In the subject invention, the same backfill (support member) can be used for different sized nip components without having to change the size and dimensions of the backfill (support member).

Fifth Embodiment

Figure 10:
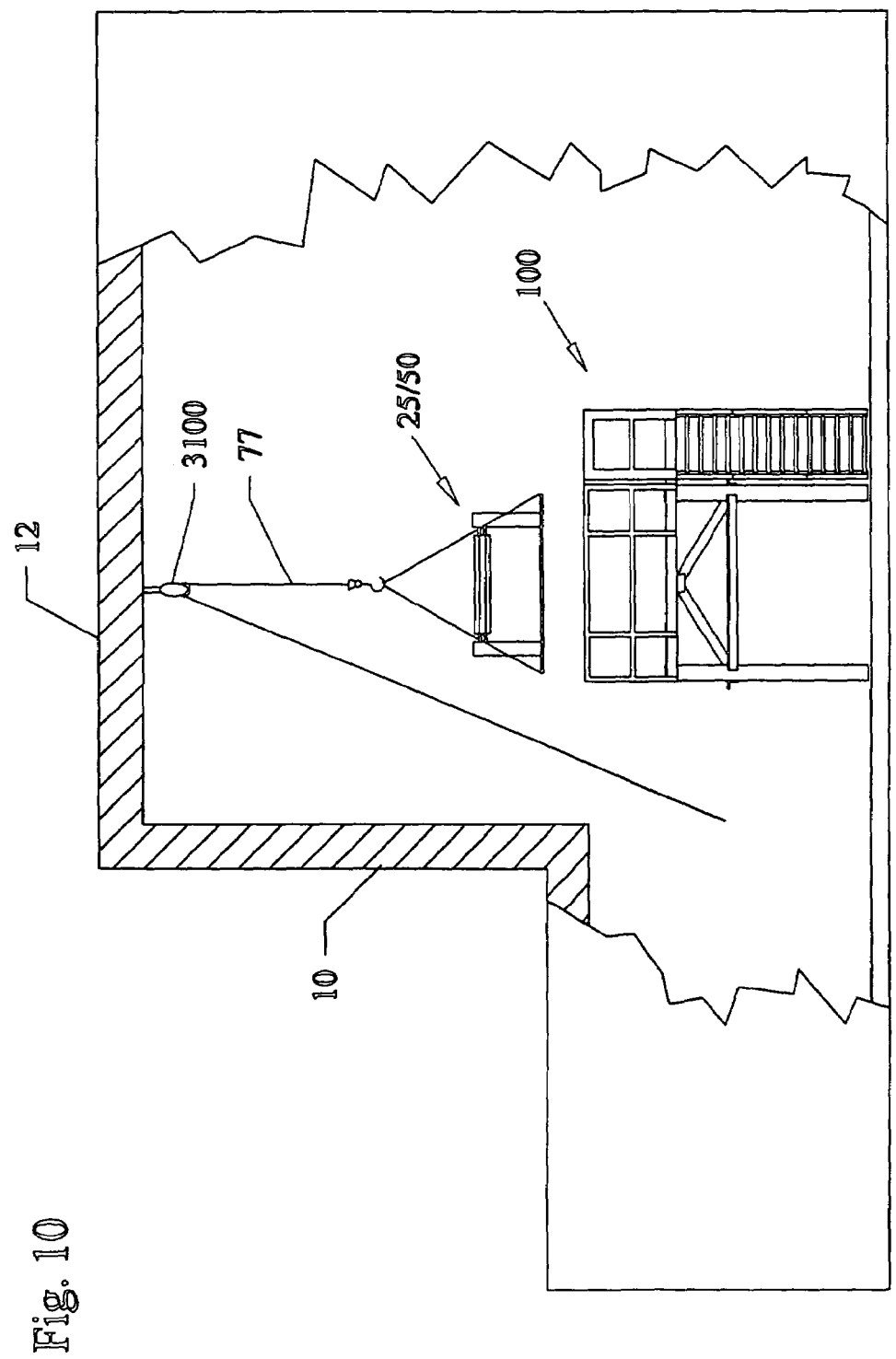
FIG. 10 shows a fifth embodiment of using hooks inside of a building for lifting tower components.

FIG. 10 shows a fifth embodiment 3000 of using lifting members such 3100 such as hooks, and block and tackle components, and pulleys inside of a building for lifting tower components, instead of having an opening through the roof 12 as disclosed in previous embodiments. For example, a hook 3100 can be attached to an interior ceiling under a roof 12 within a building, and lines 77 can lift tower components such as the nip assembly 25/50, platform assembly 100, and any other tower components. Additionally, the lifting members can be placed on pre-erected towers, rigging on the towers, and the like, within a building so that a tower can be constructed within and/or underneath an existing tower. Additionally, other lifting techniques can include forklifts, cranes, and the like, to lift and lower tower components during assembly.

Sixth Embodiment

Figure 11:
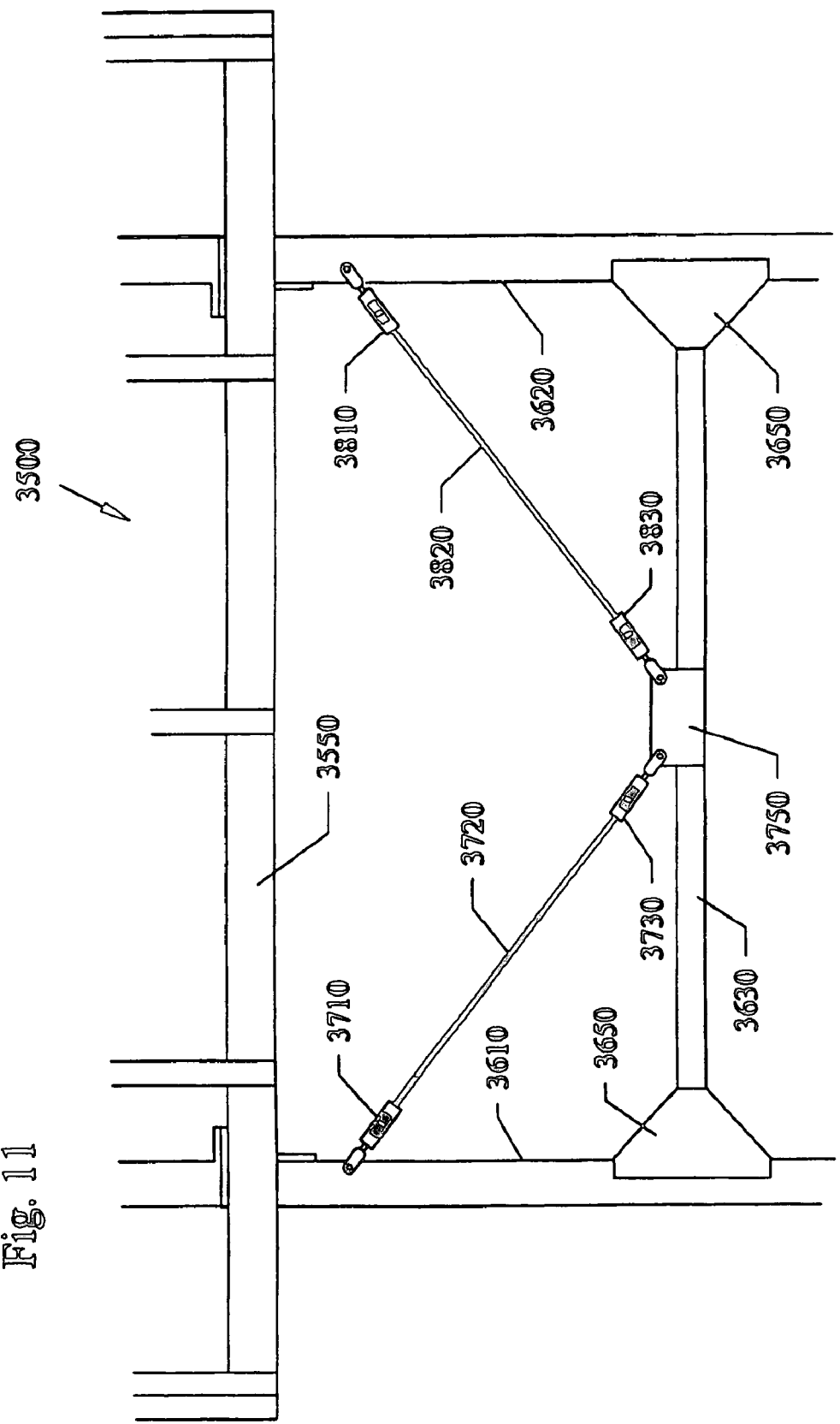
FIG. 11 shows a sixth embodiment of using adjustable braces for stiffening tower components.

FIG. 11 shows a sixth embodiment 3500 of using adjustable braces for stiffening tower components. Referring to FIG. 11, a tower components such as a deck 3550 can be supported by vertical legs 3610 and 3620 which correspond to the tower components previously described. In this embodiment a horizontal cross member 3630 can be connected and attached to pairs of vertical legs 3610, 3620 by fastening plates 3650 by removable fasteners such as bolts, screws, and the like. Alternatively, the connections can be done by welding and the like. Midway along horizontal cross member 3630 can be centrally located fastening plate 3750 having connectors 3730, 3830 such as threaded rod connectors protruding at upwardly directed angles to the respective vertical legs 3610, 3620. Adjustable braces 3720, 3820 such as threaded rods, can have one end inserted to and attached to the threaded connectors 3730, 3830, and opposite ends threadably attached to lengthening adjustment members 3710, 3810 such as but not limited to turn buckle type adjustment members, that are attached to upper side portions of the vertical legs 3610, 3620. Tightening the lengthening members 3710, 3810 such as rotating the turn buckles, can result in stiffening the tower components which can include keeping the vertical legs 3610, 3620 from swaying, twisting and vibrating that can occur to the tower(s). For example, a single platform assembly can be stiffened as needed to take care of situations when extra weight loads are placed on the towers, machinery is running on the towers, and the like. Multiple level stacked towers can also benefit by having these stiffening adjustment capability to additionally reduce any swaying, twisting and vibration effects that can occur over time.

Although the preferred lengthening adjustment members are described as threaded rods, other types of adjustment members can be used such as adjustable length cables, and the like. Furthermore, other the stiffening members can be placed on other locations of the tower such as beneath horizontal cross members, and as tie downs from the tower to ground connected ends, and the like.

Although the preferred embodiment is described using steel members that are generally bolted together, other types of materials such as but not limited to aluminum, fiberglass, hardened plastic, and the like, and other fasteners such as screws, clamps, and the like, can also be used, to form the modular novel towers of the subject invention.

While the preferred embodiments show up to three deck platform levels, the invention can be practiced with more levels as needed.

Although each of the subject invention embodiments is separately described, each of the embodiments can be used with each other in and in various combinations together.

Although the preferred embodiments are described for use in blown film processing, the invention can be used in other applications, both indoor a building and outside of a building. For example, other applications of the novel modular towers, such as but not limited to communication towers, and the like, can be erected using the novel invention embodiments.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of assembling a tower for blown film processing inside an existing building for use in blown film processing, comprising the steps of:

erecting a platform supported by columns, the platform having an opening therethrough;

attaching a base member having a nip assembly mounted thereon to a lifting mechanism that is not connected to or coupled with the platform;

lifting the nip assembly mounted on member up through the opening in the platform without the use of telescoping support members; and attaching the base member to the platform, wherein the nip assembly is used in blown film processing.

2. The method of claim 1, wherein the nip assembly is pre-attached to the support member.

3. The method of claim 1 further comprising the step of attaching hand rails to the platform.

4. The method of claim 1, further comprising the step of: attaching stairs to the platform.

5. The method of claim 1 further comprising the step of attaching hand rails to the platform; and
attaching stairs to the platform.

6. The method of claim 2, further comprising the step of: attaching stairs to the platform.

7. The method of claim 2 further comprising the step of attaching hand rails to the platform.

8. The method of claim 2 further comprising the step of attaching hand rails to the platform; and
attaching stairs to the platform.

\* \* \* \* \*